Nov. 17, 1925.  S. B. LAWTON  1,562,101

COTTON LAPPER

Filed Feb. 20, 1925  2 Sheets-Sheet 1

INVENTOR:
Samuel Burnside Lawton
By Chas. H. Luther
ATTORNEY

Nov. 17, 1925.
S. B. LAWTON
1,562,101
COTTON LAPPER
Filed Feb. 20, 1925    2 Sheets-Sheet 2
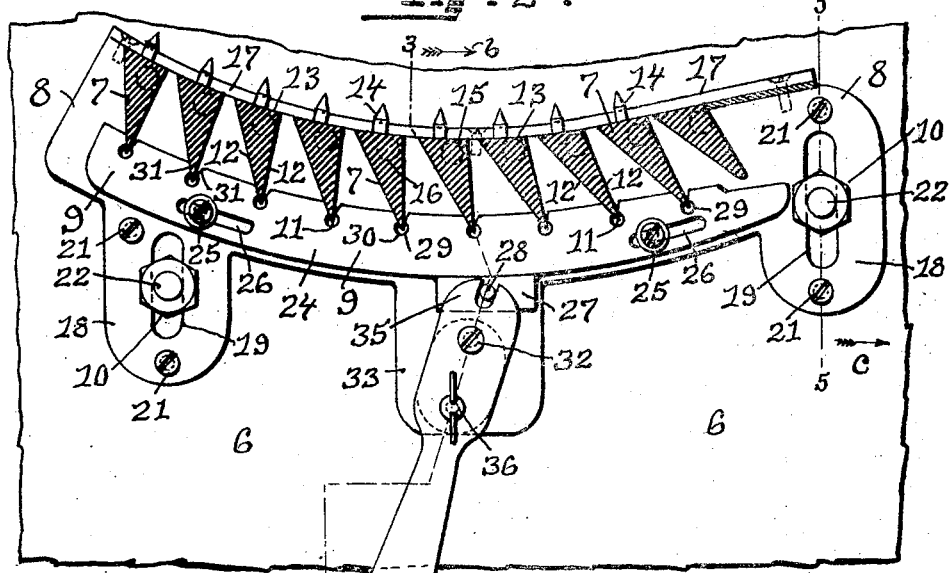
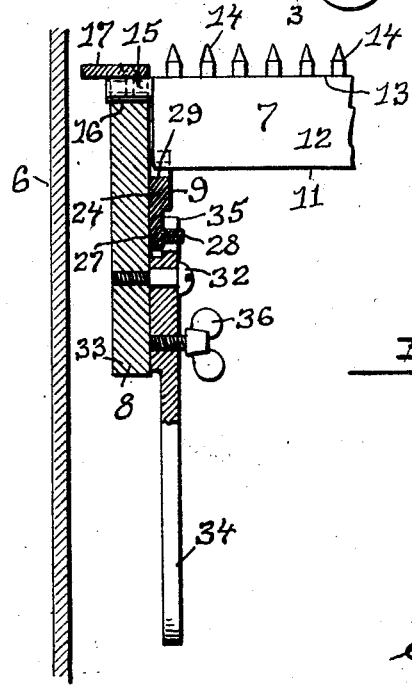
INVENTOR:
Samuel Burnside Lawton
By Chas. H. Luther
ATTORNEY Patented Nov. 17, 1925.

1,562,101

UNITED STATES PATENT OFFICE.

SAMUEL BURNSIDE LAWTON, OF CRANSTON, RHODE ISLAND.

COTTON LAPPER.

Application filed February 20, 1925. Serial No. 10,607.

*To all whom it may concern:*

Be it known that I, SAMUEL BURNSIDE LAWTON, a citizen of the United States, residing at Cranston, in the county of Providence and State of Rhode Island, have invented a new and useful Improvement in Cotton Lappers, of which the following is a specification.

My invention has reference to an improvement in cotton lappers and more particularly to an improvement in adjustable brackets for adjusting the grid bars of cotton lappers.

In the usual construction of such brackets for adjusting the grid bars of cotton lappers, the brackets are weak in construction, they are comparatively expensive to manufacture and the means for adjusting the grid bars are inadequate, as such means as heretofore provided, limit the adjustability of the grid bars that is required in present day mill practice.

The object of my invention is to improve the construction of adjustable brackets for adjusting the grid bars of cotton lappers, whereby a greater, more perfect and uniform adjustment of the grid bars is obtained, the construction of the brackets improved and the cost of manufacturing the brackets materially reduced.

A further object of my invention is to provide a cotton lapper with means for endwise adjustment of the grid bars.

My invention consists in the peculiar and novel construction of adjustable brackets for adjusting the grid bars of cotton lappers, said adjustable brackets having details of construction, as will be more fully set forth hereinafter and claimed.

Figure 2 is a transverse sectional view through the grid bars taken on line 2, 2, of Figure 1 and looking in the direction of the arrows $a$, $a$.

Figure 3 is a vertical detail sectional view taken on line 3, 3, of Figure 2 and looking in the direction of the arrows $b$, $b$.

Figure 4 is a detail transverse sectional view of one of the grid bars and showing the grid bar in one adjusted position in full lines and in the other adjusted position in broken lines, and, Figure 5 is a vertical detail sectional view taken on line 5, 5, of Figure 2 and showing the means for endwise adjustment of the grid bars.

Figure 1:
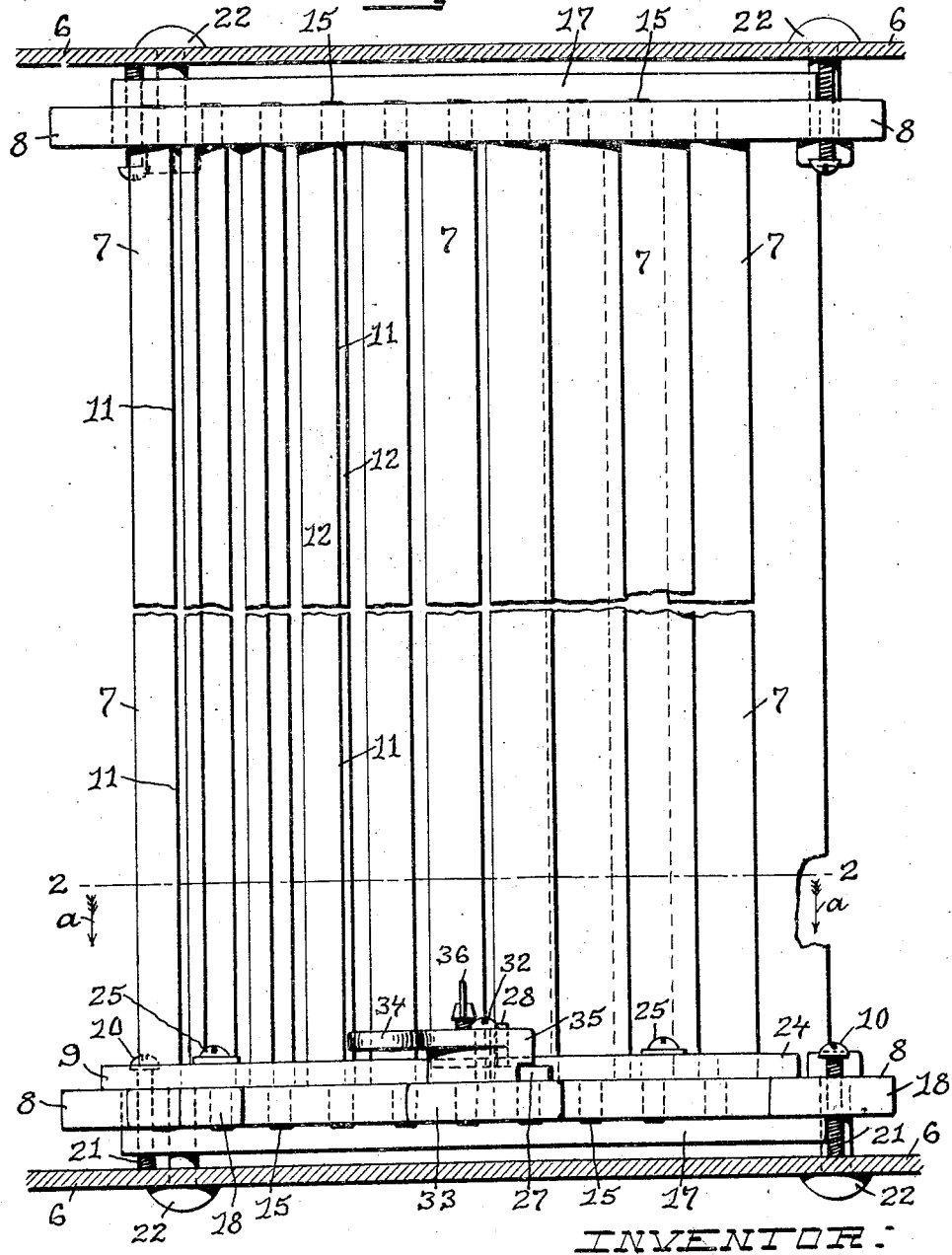
Figure 1 is a plan view looking at the underside of the grid bars of a cotton lapper provided with my improved adjustable bracket and showing a portion of the side frames of the cotton lapper in section and the central portion of the grid bars broken away, to more clearly show my invention.

In the drawings 6, 6, indicates portions of the side frames of a cotton lapper, shown in section, 7, 7, grid bars, 8, 8, adjustable bearing supports for the grid bars 7, 7, 9 my improved adjustable bracket for pivotally adjusting the grid bars 7, 7 and 10 my improved adjusting device for adjusting the grid bars endwise in the frame of a cotton lapper.

The grid bars 7, 7, are of the usual triangular construction in cross section, forming the usual V shaped lower edge 11, angular sides 12, 12, flat top 13 on which is the usual row of pointed pins 14, 14, as shown in Figures 2 and 3 and each bar has on each end a pivot trunnion 15 which pivotally supports the grid bars in bearings 16, 16 in the bearing supports 8, 8, as shown in Figure 3.

The bearing supports 8, 8 are, curved, as shown in Figure 2, to conform to the curved positions of the grid bars. The bearings 16, 16 are formed in its upper edge and the trunnions 15, 15 of the grid bars are held in the bearings by a curved plate 17 secured to the upper edge of the bearing support by screws or other well known means. A downward extension 18 is formed at each end of the bearing support, each extension having a vertical slot 19 and screw-threaded holes 20, 20, in which are screws 21, 21, which bear against the inner face of the side frame 6. A bolt 22 extends through the slot 19 and through a hole 23 in the side frame 6, the head of the bolt being preferably on the outside of the side frame 6 and the nut bearing against the inner face of the extension 18, as shown in Figure 5. By adjusting the screws 21, 21, and bolts 22, 22, at each end, the grid bars 7, 7, are adjusted lengthwise in the machine and by tightening the bolts 22, 22, the grid bars are secured in place in their adjusted position in the machine. This means of adjusting is also used for vertical adjustment of the grid bars in the machine.

The adjustable bracket 9 consists of a curved bar 24 curved to conform to the position of the V shaped lower edges 11, 11, of the grid bars and movably secured to a bearing support 8 by screws 25, 25, which extend through longitudinal slots 26, 26, in the curved bar 24 and screw into the bearing support. This bar 24 has a central downwardly extending extension 27, on which is an outwardly extending pin 28 and a series of transverse grid bar notches 29, 29, in its upper edge, one for each of the grid bars and into which the V shaped lower edges 11, 11 of the grid bars engage, as shown in Figures 2, 3 and 4. Each transverse grid bar notch 29 is shaped to have a practically semicircular bottom 30 which merges into angular side walls 31, 31, the angle of which corresponds to the angular positions of the angular sides 12, 12, of the grid bars, when the grid bars are in their extreme adjusted positions, as shown in full and broken lines in Figure 4. Pivotally secured by a pivot screw 32, to a central downwardly extending extension 33 of the bearing support 8 is a hand lever 34 having a bifurcated end 35 into which the pin 28 engages and a thumb set screw 36, which is screw-threaded through the hand lever and bears against the face of the bearing support extension 33.

When in use and it is required to adjust the transverse positions of the grid bars in a cotton lapper, the thumb set screw 36 is loosened and the hand lever 34 moved in the required direction to move the bar 24 and with it the grid bars into the exact position required when the thumb set screw 36 is again tightened, thereby holding the grid bars in their adjusted positions. The endwise adjustment of the grid bars is obtained as described above.

By the peculiar and novel construction of the grid bar notches 29, 29, each grid bar is accurately adjusted and held in its adjusted position without undue play or looseness of the grid bars. Also by the use of this construction as a whole, it can be used to replace the old inadequate construction used for this purpose, at a minimum outlay of time, labor and cost.

Having thus described my invention I claim as new:—

1. In a cotton lapper having side frames, triangular shaped grid bars and grid bar bearing supports, means for lengthwise adjustment of the grid bars, an adjustable curved bracket having grid bar notches in its upper edge, each notch having a practically semi-circular bottom and flaring side walls, means for adjustably securing the adjustable bracket to a bearing support, a hand lever operatively connected to the adjustable bracket, means for pivotally securing the hand lever to the bearing support and means for locking the hand lever to the bearing support.

2. In a cotton lapper having side frames, triangular shaped grid bars and grid bar bearing supports, an adjustable curved bracket for adjusting the grid bars, said curved bracket having curved slots and a series of grid bar notches in its upper edge, one for each grid bar, each notch having a practical semi-circular bottom and flaring side walls, a screw through each curved slot and screwed into the grid bar bearing support, a hand lever operatively connected to the adjustable bracket and pivotally secured to the bearing support and means for locking the hand lever to the bearing support.

3. In a cotton lapper having side frames, triangular shaped grid bars and grid bar bearing supports, an adjustable curved bracket for adjusting the grid bars, said curved bracket having curved slots and a series of grid bar notches in its upper edge, one for each grid bar, each notch having a curved bottom and a V shaped opening, a screw through each curved slot and screwed into the grid bar bearing support, a pin on the curved adjustable bracket, a hand lever operatively connected with the pin on the adjustable bracket, means for pivotally securing the hand lever to the bearing support and a thumb screw secured through the hand lever and bearing against the bearing support.

4. In a cotton lapper having side frames, triangular shaped grid bars and grid bar bearing supports, a central downward extension on a bearing support, an adjustable curved bracket for adjusting the grid bars, said curved bracket having a central downward extension, a pin on the central extension curved slots and a series of grid bar notches in its upper edge, one for each grid bar, each notch having a curved bottom and a V shaped opening, a screw through each curved slot and screwed into the grid bar bearing support, a hand lever having a bifurcated end into which the pin on the extension of the bracket enters, means for pivotally securing the hand lever to the extension on the grid bar bearing support and a thumb screw screwed through the hand lever and bearing against the extension of the grid bar bearing support.

5. In an adjustable grid bar bracket for adjusting the triangular shaped grid bars of a cotton lapper, an adjustable curved bracket in the form of a curved bar having curved slots, a central downward extension, a pin on the central extension, a series of grid bar notches in the upper edge of the curved bar, one for each grid bar and into which the V shaped lower edge of the grid bar enters, each notch having a curved bottom and angular side walls, the angle of which corresponds to the angle of the sides of the grid bar, when the grid bar is in either of its extreme adjusted positions, means for operating the curved bracket and means for adjustably securing the curved bracket in its operative position, in a cotton lapper.

6. In a cotton lapper having side frames, grid bars and a grid bar bearing support at each end of the grid bars for pivotally supporting the grid bars, means for adjusting the grid bars lengthwise between the side frames, consisting of bolts through the grid bar bearing supports and side frames and screws through the bearing supports and bearing against the side frames, whereby on adjusting the bolts and screws, the grid bars are adjusted lengthwise between the side frames and by tightening the bolts and screws the grid bars are held in their adjusted positions.

In testimony whereof, I have signed my name to this specification.

SAMUEL BURNSIDE LAWTON.